(12) United States Patent
Dimmer et al.

(10) Patent No.: US 8,869,711 B1
(45) Date of Patent: Oct. 28, 2014

(54) CONTROL SYSTEM FOR RAIL CAR COVER SYSTEM

(75) Inventors: Jerry R. Dimmer, Yankton, SD (US); David J. Schaefer, Yankton, SD (US); Troy Knouse, Yankton, SD (US); Steven J. Knight, Mission Hill, SD (US)

(73) Assignee: Strategic Rail Systems Company, Yankton, SD (US)

( * ) Notice: Subject to any disclaimer, the term of this patent is extended or adjusted under 35 U.S.C. 154(b) by 294 days.

(21) Appl. No.: 13/451,012

(22) Filed: Apr. 19, 2012

(51) Int. Cl.
*B61D 3/00* (2006.01)

(52) U.S. Cl.
USPC ............................................. 105/286

(58) Field of Classification Search
CPC .............. B61D 3/00; B61D 5/00; B61D 5/08; B61D 7/00; B61D 7/02; B61D 7/04; B61D 17/00; B61D 19/00; B61D 19/003
USPC ..................... 105/238.1–241.2, 280, 286–288
See application file for complete search history.

(56) References Cited

U.S. PATENT DOCUMENTS

| | | | | |
|---|---|---|---|---|
| 4,767,152 A * | 8/1988 | Stluka et al. | ............... | 296/100.1 |
| 6,402,224 B1 * | 6/2002 | Monaco et al. | ............ | 296/100.1 |
| 7,178,465 B1 * | 2/2007 | Marchiori et al. | ......... | 105/241.2 |
| 8,379,927 B2 * | 2/2013 | Taylor | ........................... | 382/104 |
| 2009/0231097 A1 * | 9/2009 | Brand | ......................... | 340/10.1 |

* cited by examiner

*Primary Examiner* — R. J. McCarry, Jr.
(74) *Attorney, Agent, or Firm* — Dicke, Billig & Czaja, PLLC

(57) ABSTRACT

A rail car cover system that includes a rail car, a first cover section, a first cover movement mechanism and a cover control system. The rail car has an opening. The first cover section is operably attached to the rail car. The first cover movement mechanism is operably attached to the first cover section. The first cover movement mechanism is capable of moving the first cover section between an open configuration and a closed configuration. The cover control system includes a first control component and a second control component. The first control component is mounted with respect to the rail car. The first control component is in communication with the first cover movement mechanism. The second control component is provided proximate to where it is desired to operate the rail car cover system. The second control component is capable of communicating with the first control component.

38 Claims, 3 Drawing Sheets

CONTROL SYSTEM FOR RAIL CAR COVER SYSTEM

FIELD OF THE INVENTION

The invention relates generally to enclosures for vehicles. More particularly, the invention relates to control systems for rail car cover systems.

BACKGROUND OF THE INVENTION

When transporting relatively large quantities of many types of products, it is typically more cost effective to transport the products in bulk where the products are placed into the vehicle that is utilized to transport the product.

Depending on various factors such as the quantity of products being shipped and the distance over which the products are being shipped, the products may be transported in a rail car, a truck or a trailer. To facilitate placing the product into and/or out of the transport vehicle, the transport vehicle may include an open top.

When transporting various types of products in open top vehicles, it is possible for air movement over the product to cause a portion of the product to be blown out of the transport vehicle. Even when a relatively small portion of material is blown out of the transport vehicle, this lost material may pose problems.

For example, when coal is being hauled in open top rail cars, relatively small coal particles or dust may be blown out of the rail cars from the flow of air over the coal as the rail cars move as well as from ambient winds. Even though the amount of coal that is blown out of a particular rail car may be relatively small, the rail cars are typically moved in relatively long trains that may each have over 100 rail cars, which may cause a significant amount of coal dust to accumulate. In addition, in certain areas, many trains may travel through the same area numerous times each day, which could result in significant accumulation of the material blown out of the rail car over extended periods of time.

When the coal particles accumulate proximate to the railroad tracks over which the trains pass, the quality of the rail bed may be degraded. For example, the ability of the rail bed to properly drain water from rain or melting snow is diminished which can lead to the saturation of the rail bed and subsoil beneath the tracks. This water saturation could lead to potentially dangerous situations such as derailment of rail cars.

There have been various attempts to reduce coal particles escaping from the rail cars and contaminating the roadbed and the surrounding environment. Unfortunately, there are numerous barriers that exclude the use of a tarp or previously known mechanical closures. One such challenge is that in some locations coal is loaded and unloaded from rail cars while the rail cars are moving. Another challenge is that in other locations rail cars are completely inverted during the unloading process. The prior rail car cover designs interfere with the use of equipment that is used in conjunction with loading and unloading the rail cars using the preceding mechanisms.

One dust controlling technique involves spraying water on top of the coal. While water initially works well, water tends to evaporate relatively fast because of the air flow over the coal pile as the rail car moves. Additionally, water tends to be in relatively short supply in some areas where coal is mined.

Another technique involves spraying water soluble chemicals over the coal to create a wind resistant crust. While these materials can last much longer than water, they are considerably more expensive than water and must be mixed with water, which can be in relatively short supply in some regions where coal is mined as noted above.

During transit, coal tends to shift which can decrease the effectiveness of the wind resistant crust. There are also potential issues relating to the water soluble materials being compatible with the power plants in which the coal is burned.

It has also been proposed to place a rigid cover over the rail car. Prior to the coal loading or unloading process, the rail car rigid cover is lifted off of the rail car. Once the loading or unloading process is completed, the rail car rigid cover is replaced onto the rail car.

Because of the relatively large size of the rail car rigid cover, there are challenges associated with handling the rail car rigid cover during the coal loading process at the mine and the unloading process at the power plants. Because of the fact that the rail car rigid cover handling equipment may be relatively large and the process cumbersome or in the case of bottom dump unloading it may be possible that the rail car rigid cover can remain in the closed configuration on the rail car during the dumping process if it has adequate venting capabilities.

SUMMARY OF THE INVENTION

An embodiment of the invention is directed to a rail car cover system that includes a rail car a first cover section, a first cover movement mechanism and a cover control system. The rail car has an opening.

The first cover section is operably attached to the rail car. The first cover movement mechanism is operably attached to the first cover section. The first cover movement mechanism is capable of moving the first cover section between an open configuration and a closed configuration.

The cover control system includes a first control component and a second control component. The first control component is mounted with respect to the rail car and is in communication with the first cover movement mechanism.

The second control component is provided separate from the rail car proximate to where it is desired to operate the rail car cover system. The second control component is capable of communicating with the first control component.

Another embodiment of the invention is directed to a method of operating a rail car cover system. A rail car having an opening is provided. A first cover section is operably attached to the rail car.

A first magnetic field is generated. The first magnetic field is sensed by a first control component that is operably attached to a first cover movement mechanism. The first cover section is moved with respect to the rail car between an open configuration and a closed configuration using the first cover movement mechanism.

Another embodiment of the invention is directed to a method of operating a rail car cover system. A rail car having an opening is provided. A first cover section is operably attached to the rail car.

One method of communication is using RFID technology. An RFID reader is mounted proximate to where it is desired to operate the rail car cover system. An RFID tag, which is operably attached to a first cover movement mechanism, communicates with the RFID reader.

When the RFID reader communicates with the RFID tag, the first cover section moves with respect to the rail car between an open configuration and a closed configuration using the first cover movement mechanism.

Another method of communication is using Real Time Location System (RTLS) technology. A transmitter is mounted track side. The transmitter broadcasts a Radio Frequency (RF) wake up signal and an open or close signal. A receiver is mounted on the rail car.

When the receiver detects the wake up signal, it begins searching for an open/close signal. The receiver uses signal strength as a method of measuring distance to the transmitter. Once the open/close signal strength reaches a set threshold, the receiver activates an open or close sequence.

To inadvertently mimic the RTLS signal, one would have to transmit two frequencies for open and two frequencies to close, transmit both signals at the appropriate signal strengths, and transmit the frequencies with the appropriate time between the peak signals.

The RTLS system may also have a speed detection capability with an adjustable variable to not activate the open/close sequence above certain speeds. In certain embodiments, the speed threshold is set at 6 MPH.

Another embodiment of the invention is directed to a method of operating a rail car cover system. A rail car having an opening is provided. A first cover section is operably attached to the rail car.

A first signal is generated. The first signal is received by a first control component that is operably attached to a first cover movement mechanism. The first signal causes the first control component to change from a first operational mode to a second operational mode.

A second signal is generated. The second signal is received by the first control component. In response to the first control component receiving the second signal, the first cover movement mechanism causes the first cover section to move with respect to the rail car between an open configuration and a closed configuration.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

An embodiment of the invention is directed to a control system for a rail car cover system. In addition to the control system, the rail car cover system 10 includes a rail car cover and a rail car cover opening system. Each of these components works together to cause the rail car cover to move between a closed configuration and an open configuration.

Figure 1:
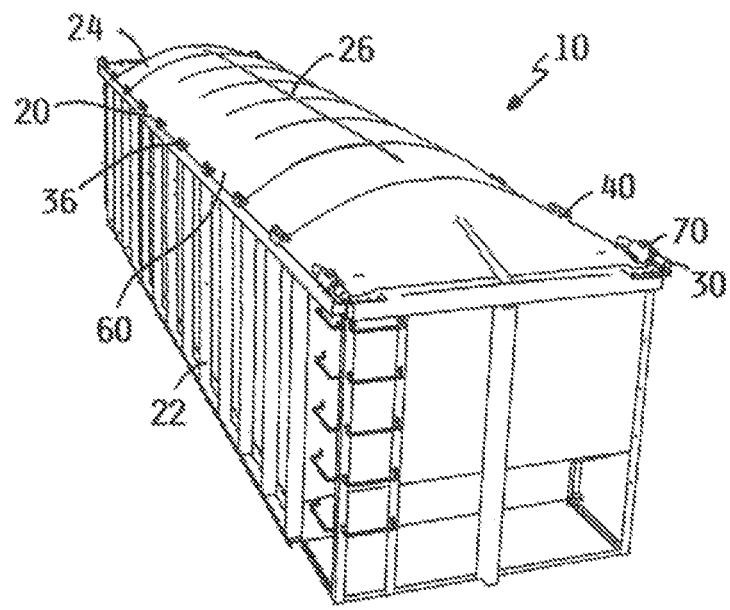
FIG. 1 is a perspective view of a rail car cover system on which a control system according to an embodiment of the invention is used where the rail car cover system is in a closed configuration.
Figure 2:
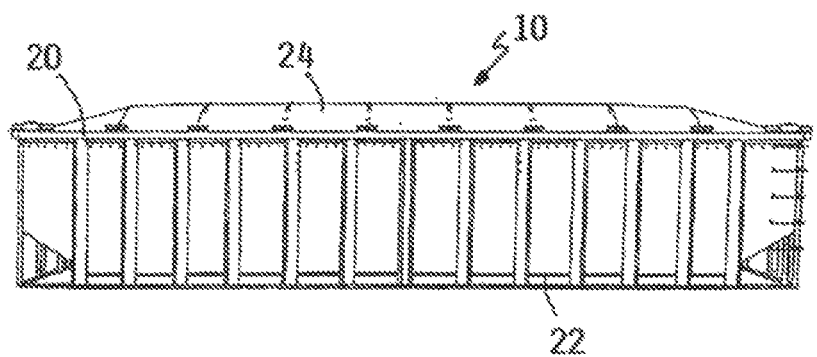
FIG. 2 is a side view of the rail car cover system in the closed configuration.
Figure 3:
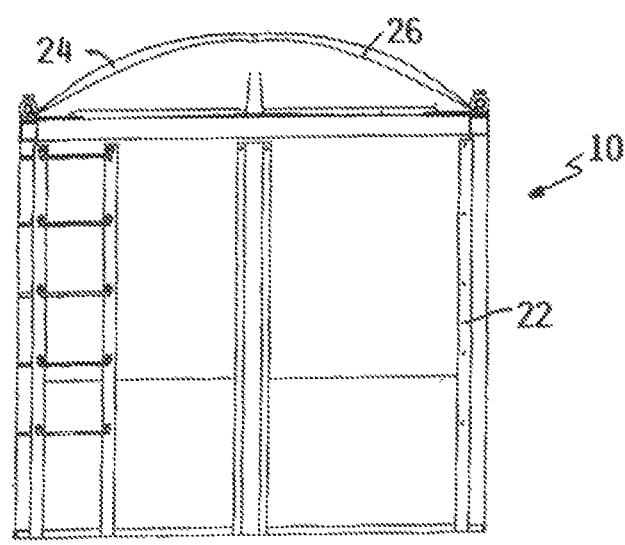
FIG. 3 is an end view of the rail car cover system in the closed configuration.
Figure 4:
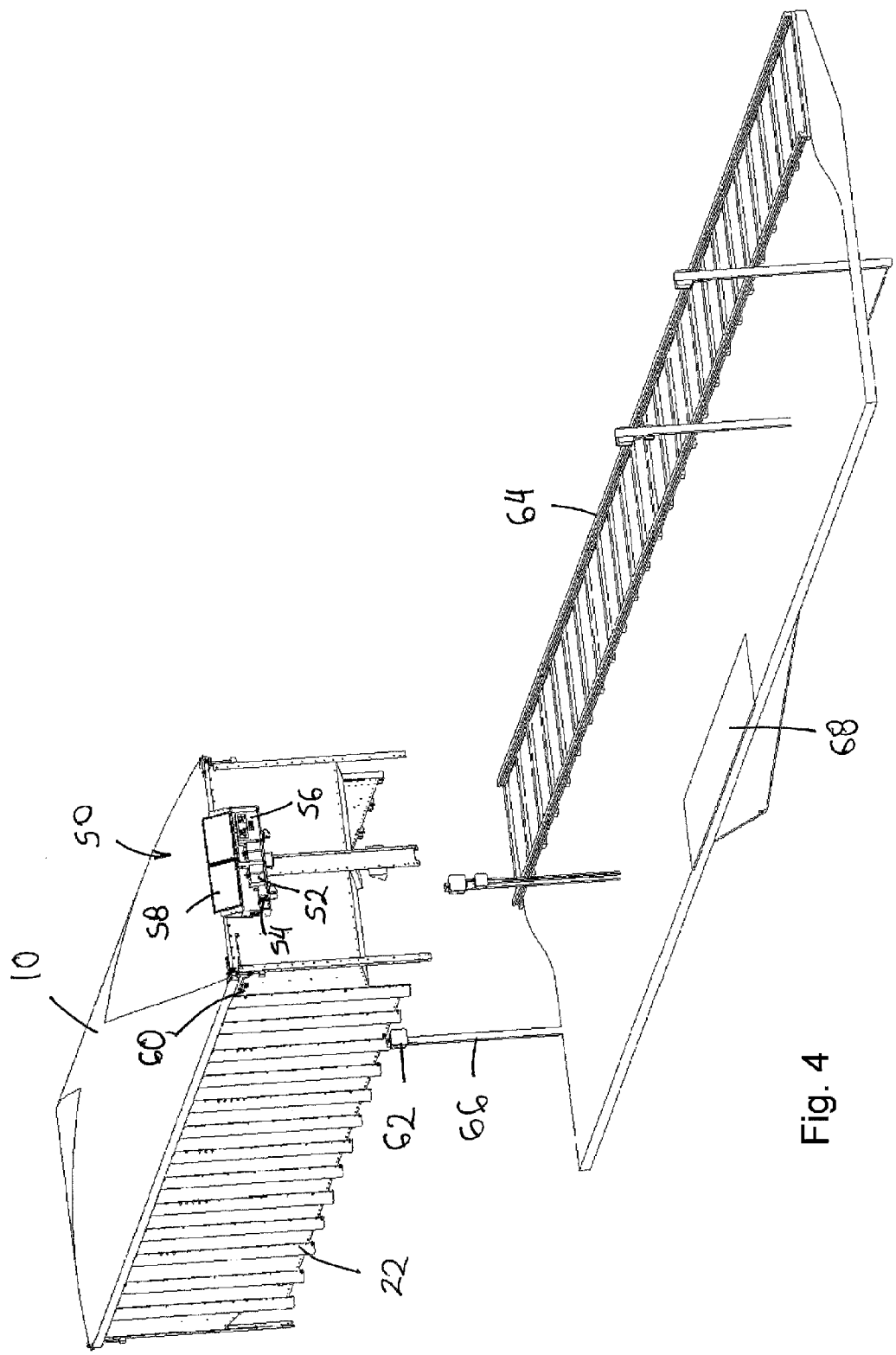
FIG. 4 is a perspective view of the rail car having the rail car cover system thereon used in conjunction with a control system.

The rail car cover system 10 is suited for use in conjunction with a rail car 22 having an upwardly directed opening such as is illustrated in FIGS. 1-3. The rail car cover system 10 substantially covers an upper end 20 of the rail car 22 when in the closed configuration. The rail car 22 does not illustrate wheel assemblies because a variety of types of wheel assemblies such as are suited for use on rails or conventional roads may be used in conjunction with the rail car cover system 10 of the current invention.

An example of one product that may be transported in the rail car 22 is coal. An advantage of using the rail car cover system 10 in conjunction with the rail car 22 is that the rail car cover system 10 provides near complete coal dust mitigation in a highly reliable manner.

While the concepts of the invention are particularly suited for use in conjunction with rail cars 22 that carry coal, a person of skill in the art will appreciate that other materials may be transported in the rail car 22.

An example of one such alternative material is grain, which is more susceptible to being blown out of an uncovered top on the rail car 22 as well as being more susceptible to damage caused by precipitation. The rail car cover system 10 can be adapted for use in conjunction with rail cars 22 having a variety of heights, lengths and widths.

Another advantage of the rail car cover system 10 is that it enhances the aerodynamics of the rail car 22, which may be more important when the rail car 22 is moving empty. Using the rail car cover system 10 in conjunction with the rail car 22 could thereby enhance the fuel efficiency of the train. In certain embodiments, the increase in the fuel efficiency of the train may be up to about 20 percent.

Yet another advantage of the rail car cover system 10 is that it reduces the potential of precipitation entering the rail car 22 and thereby affecting the ability to unload the coal from the rail car 22. For example, water that enters the coal pile and then freezes because of low ambient temperatures could cause the coal pile to solidify. When this occurs, it is typically necessary to heat the rail car 22 before it is possible to unload the coal from the rail car 22. Such heating is undesirable because it increases the cost of delivering the coal to the customer.

In certain embodiments, the rail car cover includes a first cover section 24 and a second cover section 26. The first cover section 24 and the second cover section 26 are operably attached to opposite sides of the rail car 22. In certain embodiments, the first cover section 24 and the second cover section 26 may have a substantially identical configuration. In other embodiments, the rail car cover system 10 may include a single cover section or the cover sections may not have a substantially identical configuration.

While it is illustrated that the rail car cover substantially covers the opening on the rail car 22, it is also possible to fabricate the rail car cover system 10 having a length and a width that is less than the length and/or width of the rail car 22 to which it is attached.

The rail car cover system 10 may be operably attached to the rail car 22 using at least one corner hinge mechanism 30 and at least one intermediate hinge mechanism 36, 40. In certain embodiments, one of the corner hinge mechanisms 30 is proximate to each of the corners of the rail car 22. At least one intermediate hinge mechanism 36, 40 is positioned along each side of the rail car 22 between the corner hinge mechanisms 30.

In an embodiment of the invention, the opening system includes at least one hydraulic actuator 70 and at least one pump that delivers hydraulic fluid to the hydraulic actuator 70 to thereby cause the hydraulic actuator 70 to move the first and second cover sections 24, 26 between the open and closed configuration.

The rail car cover system 10 may include a power system 50 that is mounted on the same rail car 22 on which the rail car cover system 10 is located. Using such a configuration enables the rail car cover system 10 to operate without attachment to an external power source. Also, providing the power on each of the rail cars 22 enables any number of rail cars 22 to be connected together in the train.

In one configuration of the power system 50, at least one battery 52 is used to power the operation of the hydraulic fluid pump 54 and the control system 56. The power system 50 may also include at least one solar panel 58 that is operably linked to the battery 52 to recharge the battery 52.

The rail car cover system 10 may also include a cover position sensing system that discontinues operation of the opening system when the first and second cover sections 24, 26 are in the open or closed configuration to thereby minimize the potential of damage to components of the rail car cover system 10 when the opening system continues to operate after the first and second cover sections 24, 26 reach the ends of their range of motion.

In certain trains that are used to carry coal, the train may include more than about 100 rail cars. Because of the length of the train, there may be challenges associated with manually operating the rail car cover system 10 on each of the rail car 22 such as to cause the rail car cover system 10 to move to the open configuration prior to loading the coal into the rail car and then to cause the rail car cover system 10 to move to the closed configuration after the coal is loaded into the rail car.

In certain locations, it may not be desirable for the rail car cover systems 10 on all of the rail cars 22 to move to the open configuration at the same time because there may be a significant length of time between when the product is loaded into the first rail car 22 in the train and when the product is loaded into the last rail car 22 in the train.

In view of the preceding comments, it is desirable for the operation of the rail car cover system 10 to be at least partially automated. In one configuration, the control system includes a first control component 60 and a second control component 62.

The first control component 60 is mounted on the rail car 22. The first control component 60 may be mounted proximate to an upper edge of the rail car 22 to minimize the potential of the first control component 60 being damaged as the rail 22 moves.

In certain embodiments, the first control component 60 may be mounted to a side of the rail car 22 proximate an end of the rail car to which the power system 50 is attached. In other embodiments, it is possible for the first control component to be mounted other than on an exterior surface of the rail car 22 to further protect the first control component 60 from damage.

The second control component 62 is mounted proximate to a facility 68 where the product is loaded into the rail car 22 or where product is unloaded from the rail car 22 such that it would be desirable to operate the rail car cover system 10. In certain embodiments, there may be more than one of the second control components 62 mounted on either side of the facility 68.

In certain embodiments, the second control component 62 is mounted such as on a ground surface that is adjacent to the tracks 64 over which the rail car 22 moves. In other embodiments, the second control component 62 may be attached to a structure such as a post 66 or a building so that the second control component 62 may be in close proximity to the first control component 60 as the rail car 22 moves over the tracks 64. The second control component 62 is thereby not mounted on the rail car 22.

The first control component 60 and the second control component 62 communicate to cause the opening system to move the first and second cover sections 24, 26 between the open and closed configurations.

The control system may include three operational modes. In the first operational mode, nearly all of the components of the rail car cover system 10 are turned off. The first operation mode thereby minimizes power consumption when it is not desired to operate the rail car cover system 10. While in the first operational mode, the first control component 60 may periodically check for communications that are sent by the second control component 62.

In the second operation mode, the first control component 60 activates the control system such that the control system is ready to operate the hydraulic pump 54 once the first control component 60 receives the appropriate instructions from the second control component 62.

An example of one suitable configuration is that the control system includes a relay that is turned on when the control system moves to the second operational mode. Once the control system is turned on, the rail car cover system 10 is able to be operated such as moving between open and closed configurations. Once the control system receives instructions to change to the third operational mode, the control system may cause the relay to be turned off.

If the first control component 60 does not receive the appropriate instructions from the second control component 62 to operate the hydraulic pump 54 within a specified period of time after entering the second operational mode, the first control component 60 may revert to the first operational mode. In one such embodiment, the specified period of time is less than about 5 minutes. In other embodiments, the specified period of time is less than about 2 minutes.

If the first control component 60 receives the appropriate instructions from the second control component 62 within the specified period of time, the first control component 60 switches to the third operational mode in which the rail car cover system 10 is moved between the open and closed configurations.

The instructions that cause the control system to change from the first operational mode to the second operational mode may be different than the instructions that cause control system to change from the second operation mode to the third operational mode.

Such a process reduces the potential of the rail car cover system 10 being operated inadvertently or being operated by someone who is not authorized to operate the rail car cover system 10.

While it is possible to utilize physical contact between an activation mechanism on the rail car 22 and a ground-mounted structure, mechanical activation mechanisms may experience reliability issues. For example, if the rail car cover system 10 is used in a region that receives snow and/or freezing rain, the snow and/or freezing rain could interfere with the correct operation of the mechanical activation mechanism.

Additionally, since the mechanical activation mechanisms must be located in close proximity to the tracks 64 over which the rail car 22 moves, the mechanical activation mechanism is more likely to be damaged than other mechanisms that do not require physical contact between two components to cause movement of the rail car cover system 10 between the open and closed configurations. The mechanical systems are also more susceptible to inadvertent or unauthorized operation.

In one embodiment, a magnetic field is utilized to cause the control system to change from the first operational mode to the second operational mode. The magnetic field may be generated by a magnet that is incorporated in the second control system 62, which is mounted proximate to where it is desired to operate the rail car cover system 10.

The first control component 60 senses the magnetic field emitted from the second control component 62 as the rail car 22 approaches the second control component 62 so that the second control component 62 is proximate the first control component 60. The required distance between the first control component 60 and the second control component 62 may depend on factors such as the strength of the magnetic field.

The magnetic field sensor may operate in a variety of different configurations. Examples of two suitable configurations for the magnetic field sensor are mechanical and electronic.

To reduce the potential of unintentional or unauthorized operation of the rail car cover system 10, the magnetic field generated by the second control component 62 may not be consistent. In one such embodiment, at least one magnet is rotatably mounted within the second control component 62.

The rotation creates a magnetic pulse frequency that can also be used to instruct the control system to open or close. For example, the magnetic pulse frequency associated with the instructions to move the rail car cover system 10 to the open configuration may be considerably faster than the magnetic pulse frequency associated with the instructions to move the rail car cover system 10 to the closed configuration or it may have a variable frequency pattern similar to dots and dashes in Morse code which would give it "key like" encryption. Alternatively, the magnetic pulse frequency may be created using an electromagnet that is turned on and off at a desired rate.

The frequencies for instructing the rail car cover system 10 to move between the open and closed configurations may be selected such that they are not impacted by whether the train is moving at a very slow speed or a slightly faster speed, but will not function if the train is moving too fast.

In certain embodiments, the magnetic pulse frequency associated with moving the rail car cover system 10 to the open configuration may be between about 100 and 150 pulses per second and the magnetic pulse frequency associated with moving the rail car cover system 10 to the closed configuration may be between about 30 and 60 pulses per second.

Another benefit of using rotating magnets is that if the magnets are rotating at a known frequency, the first control component can recognize pulses as being indicative of the presence of the second control component 62 in proximity thereto. The first control component 60 can also count the total number of pulses and thereby use the number of counted pulses to determine the speed at which the rail car 22 is moving.

In another configuration of the invention, the control system is associated with an RFID system that includes a first RFID component mounted on the rail car 22 and a second RFID component mounted proximate to unloading region.

The RFID systems generally include a two-part configuration. One part is the RFID tag and the other part is an RFID reader that is in communication with the RFID tag. Since the control system is located on the rail car 22, the RFID tag would be mounted on the rail car 22. A person of skill in the art will appreciate that the RFID tags may have a variety of configurations, examples of which include passive, active and battery assisted passive.

Another method of communication that may be used in conjunction with the control system for the rail car cover system 10 is using Real Time Location System (RTLS) technology. The RTLS system may generally include a transmitter and a receiver.

In one configuration, the transmitter (second control component) is mounted adjacent to the track 64 where it is desired to operate the rail car cover system 10. The transmitter broadcasts a Radio Frequency (RF) wake up signal and an open or close signal. The receiver (first control component) is mounted on the rail car 22.

When the receiver detects the wake up signal, it begins searching for an open/close signal. The receiver may use signal strength as a method of measuring distance to the transmitter. Once the open/close signal strength reaches a set threshold, the receiver activates an open or close sequence.

To inadvertently mimic the RTLS signal, one would have to transmit two frequencies for open and two frequencies to close, transmit both signals at the appropriate signal strengths, and transmit the frequencies with the appropriate time between the peak signals.

The RTLS system may also have a speed detection capability with an adjustable variable to not activate the open/close sequence above certain speeds. In certain embodiments, the speed threshold is set at 6 MPH.

Other than the differences between the components used in conjunction with the RFID system, the RFID system may operate in a similar manner to the magnetic control system that is discussed above. Such operation may include a first operational mode where the opening system is off, a second operational mode where the opening system is on and a third operational mode where the opening system is causing the rail car cover system 10 to move between the open and closed configurations.

An advantage of using the RFID technique and/or the RTLS technology to control the operation of the rail car cover system 10 is that these techniques offer a higher level of security than the magnetic option that is discussed above. A potential drawback of the RFID and/or RTLS control system is potential interference from other RF systems that are used in conjunction with rail cars. The RF systems may also be more expensive to manufacture than the magnetic systems that are discussed above.

In another configuration for the operation of the rail car cover system 10, a hand-held trigger is utilized to cause the rail car cover system 10 to move between the open configuration and the closed configuration. The hand-held trigger may assume a variety of configurations encompassing the concepts of the invention. The RFID and the RTLS systems may utilize a hand-held remote to replicate the signals sent by the track side devices. Both types of remotes may broadcast at a reduced signal strength to limit the number of cars being operated at a time.

In one such configuration, the hand-held trigger is a remote control unit that is sufficiently small so that the device may be held in the hand of the person who desires to operate the rail car cover system 10. An example of one such protocol that may be used to communicate between the hand-held trigger and the control system is radio frequency.

The hand-held trigger may be configured to simultaneously operate the rail car cover systems 10 on all of the rail cars 22 in the train when the hand-held trigger is activated. In other configurations, the hand-held trigger may be configured to only activate particular rail cars 22 or groups of rail cars 22. For example, the rail cars 22 may be activated in groups of about 5-10 rail cars so that the person using the hand-held trigger may watch the operation of the rail car cover system 10 to visually confirm that the rail car cover system 10 is accurately operating.

In one configuration of the hand-held trigger, pressing the appropriate button on the hand-held trigger may turn on the control system and cause the control system to move the rail car cover system 10 between the open and closed configurations. As is discussed above, the hand-held trigger may have a limited transmission range to limit the number of rail cars that are in communication with the hand-held trigger at a given time.

During this process, the indicator may indicate that the rail car cover system 10 is normally operating. Alternatively, the hand-held trigger may include separate commands to turn on the control system and to move the rail car cover system 10 between the open and closed configurations.

In other embodiments, it may be possible to control the operation of the rail car cover system 10 in individual rail cars. In such a configuration, may enter an identification number associated with a particular rail car 22 into the hand-held remote. Such an identification number may be printed on the side of the rail car 22. Such a control system may be more suited for use in conjunction with the RTLS system that is implemented using software that is installed on a computer such as a notebook or tablet computer. The computer may include a Zig-Bee antennae system.

Because there is potentially a higher level of security associated with the communication between the hand-held trigger and the control system on each of the rail cars 22, it may not be necessary to use a two-step process as is discussed above with respect to the magnetic configuration.

To further minimize the potential of unintentional or unauthorized operation of the rail car cover system 10, one of the preceding techniques may be used to cause the control system to change to the second operational mode and another technique may be used to cause the control system to change to the third operational mode.

In one configuration of the control system, audible and/or visual feedback is provided to indicate when the control system is in the second operational mode or the third operation mode. While the following comments are with respect to visual feedback, a similar procedure may be used to provide audible feedback. The audible feedback may be provided as an alternative to the visual feedback or in addition to the visual feedback.

The indicator may be mounted to a surface such as the side of the rail car 22 so that the indicator may be viewed as the rail car 22 is moving on the tracks 64. Alternatively or additionally, the indicator may be mounted to a surface of the enclosure that extends around at least a portion of the power system 50.

When the rail car cover system 10 is in a fully open configuration or a fully closed configuration and the control system is turned off, the indicator may be turned off. The indicator light may also turn off even when the rail car cover system 10 is in an error mode for a period of time that is greater than a selected notification time period.

The indicator may illuminate in the first color when the control system has been turned on and is ready to be operated. In one such configuration, the indicator may be continuously illuminated a first color such as green when the control system is on and there are no errors sensed. When the indicator is turned off, the control system is turned off.

The indicator may blink in the first color to indicate that the rail car cover system 10 is moving between the open configuration and the closed configuration and the components are operating normal. In one such embodiment, the blinking includes turning the indicator on or off about every second.

The indicator may illuminate in a second color such as red to indicate that there is a problem with the control system. For example, blink in the second color to indicate that there is an error as the rail car cover system 10 was moving such as to indicate that the load placed on the hydraulic system is too large. In one such embodiment, the blinking includes turning the indicator on or off about every second.

In another embodiment, the second rate of blinking includes turning the indicator on or off about 3 times per second. Such a difference between the rates of blinking is sufficiently large such that a person may readily ascertain whether the blinking signifies the rail car cover system 10 is operating normally or experiencing an error.

In still another embodiment, the indicator may continuously illuminate in the second color to indicate that there is a serious system fault, which prevents the rail car cover system 10 from operating.

In other embodiments, the control system does not provide any audible or visual feedback to indicate whether the control system is in at least one of the first operational mode, the second operational mode or the third operational mode. Such a configuration reduces the potential of unauthorized operation of the rail car cover system 10 because persons attempting to gain such unauthorized access will not be able to determine whether their actions have caused the control system to turn on such that it is possible to operate the rail car cover system 10.

In yet another configuration, the audible and/or visual feedback may only be provided after the control panel has been opened. This configuration may enhance the ability to troubleshoot operational issues relating to the rail car cover system. Alternatively or additionally, the operational status of the rail car cover system 10 may be transmitted to the hand-held controller.

In operation, the train that includes a plurality of open top gondola rail cars 22 that each have the rail car cover system 10 is moved to the location where it is desired to load product into the rail cars 22. During the process of moving the train to the product loading location, the first and second cover sections 24, 26 may be in a closed configuration.

As is discussed above, moving the train with the first and second cover sections 24, 26 in the closed configuration may enhance the aerodynamic aspects of the train to thereby reduce the fuel that is consumed when the train is moving.

As each of the rail cars 22 gets sufficiently close to the second control component 62 that is mounted in proximity to the tracks 64 proximate to the product loading location, the first control component 60 on each of the rail cars 22 senses the magnetic pulse frequency generated by the magnets rotating at a first frequency in the second control component 62. The first control component 60 may also sense the intensity of the magnetic field generated by the second control component 62.

If this magnetic pulse frequency is within the parameters stored in the first control component 60, the first control component 60 causes the control system to turn on and be in the second operational mode.

As the train continues to move, the first control component 60 on each of the rail cars 22 comes into proximity with another second control component 62 that is mounted in proximity to the tracks 64. This second control component 62 generates a magnetic pulse frequency that is different than the second control component 62 that was previously encountered. The first control component 60 may also sense the intensity of the magnetic field generated by the second control component 62.

When this magnetic pulse frequency is sensed by the first control component 60 mounted on each of the rail cars 22, the control system activates the hydraulic pump 54, which causes the rail car cover system 10 to move from the closed configuration to the open configuration.

In one configuration, the rail car cover system 10 includes a magnetic closure to retain the first cover section 24 and the second cover section 26 in the closed configuration. As the first cover section 24 and the second cover section 26 are moving towards the open configuration, the first magnet portion slides away from the second magnet portion until the first magnet portion is no longer adjacent to the second magnet portion.

The rail car cover system 10 may be configured so that one of the first cover section 24 and the second cover section 26 completes its movement from the partially open configuration to the fully open configuration. When this occurs, the other one of the first cover section 24 and the second cover section 26 continues to move from the partially open configuration to the fully open configuration. In another configuration, the first cover section 24 and the second cover section 26 may simultaneously move from the partially open configuration to the fully open configuration.

When the cover position sensor indicates that the rail car cover system 10 is in the fully open configuration, the indicator may change from blinking at the first rate to being continuously illuminated. At this time, the hydraulic pump 54 is turned off. To conserve battery power, the control system is also turned off. When the control system is turned off, the indicator may also turn off to indicate that the control system has been turned off.

After the loading process is completed, the rail car 22 moves until the rail car 22 is proximate the second control component 62 that is mounted adjacent to the tracks 64 over which the rail car 22 is moving. The second control component 62 may be the same as the first control component 60 that is used in conjunction with opening of the rail car cover system 10 such as when the train moves in opposite directions when entering and leaving the product loading facility.

The second control component 62 causes the control system to enter the second operational mode where control system turns on. This process causes the indicator to turn on and remain illuminated. The train continues to move until another second control component 62 moves into proximity to the first control component 60. The magnetic field generated by the second control component 62 causes the system to change to the third operational mode where the first and second cover sections 24, 26 move to the closed configuration. The indicator blinks at the first rate to indicate that the rail car cover system 10 is normally operating.

During the process of moving the first cover section 24 and the second cover section 26 from the fully open configuration to the closed configuration, the first cover section 24 and the second cover section 26 may start moving at different times and/or move at different rates. For example, the second cover section 26 may begin moving before the first cover section 24. Since the second cover section 26 has the metal plates thereon, the second cover section 26 should move to the closed configuration first so that the metal plates are beneath the magnets on the first cover section 24.

Alternatively or additionally, the corner hinge mechanisms 30 at opposite ends of the first cover section 24 may move at different rates. For example, the corner hinge mechanism 30 proximate the control panel end of the rail car 22 may rotate more quickly than the corner hinge mechanism on the end of the rail car 22 that is opposite the control panel.

It is possible for the corner hinge mechanisms 30 at opposite end of the first cover section 24 to rotate at different rates because the only connection between the corner hinge mechanisms 30 is through the cover material 60, which is flexible.

When one of the corner hinge mechanisms 30 reaches the closed configuration, the cover position sensor is activated, which may cause hydraulic fluid to stop flowing to the hydraulic actuator 70 associated with the corner hinge mechanism 30. In other configurations, the hydraulic fluid continues to flow to each of the hydraulic actuators 70 and the hydraulic actuators 70 that are not in the closed configuration continue to operate because there is less resistance placed thereon.

When all of the corner hinge mechanisms 30 are in the closed configuration as indicated by the cover position sensors, the indicator light changes from blinking to solid on and the hydraulic pump is turned off. Shortly thereafter, the control system and the indicator are turned off.

The preceding process may be repeated once the train arrives at a location where it is desired to discharge the product from the rail car 22 using a tipping mechanism. If the product is discharged from the lower end of the rail car 22 using hopper doors mounted on a lower surface of the rail car 22, it may not be necessary to move the rail car cover system 10 from the closed configuration to the open configuration prior to discharging product from the rail car 22.

In another configuration of the invention, an operation switch may be provided on the control panel. The operation switch may be used to operate the rail car cover system 10. To reduce the potential unintentional or unauthorized operation of the rail car cover system 10, the operation switch may be associated with a key lock such that the operation switch may only be operated by a person having the key that is associated with the key lock.

Because of the time associated with the operator using the operation switch on each of the control panel associated with each of the rail cars 22, such a configuration may not be an alternative to the automatic trigger or the hand-held trigger that are discussed above.

The primary function of the operation switch may be when a particular rail car 22 experiences a problem such that the rail car cover system 10 does not open or close with the rail car cover systems 10 on the other rail cars 22 in the train. For example, the particular rail car 22 is unable to communicate with the automatic trigger or the hand-held trigger.

The operation switch causes the control system to be bypassed. The operation switch activates the hydraulic pump 54 directly to cause the rail car cover system 10 to move from the open configuration and the closed configuration.

When the cover position sensor indicates that the rail car cover system 10 is in the fully open configuration, the hydraulic pump 54 may be turned off. To conserve battery power, the control system may be turned off.

If the operator decides to discontinue movement of the rail car cover system 10 at any time prior to the first and second cover sections 24, 26 reaching the fully open configuration, the operator may use the operation switch to stop the movement of the first cover section 24 and the second cover section 26. For example, the operator may stop movement of the first cover section 24 and the second cover section 26 if the operator sees there is a problem with the rail car cover system 10.

In addition to stopping the movement of the first and second cover section 24, 26 from the closed configuration to the open configuration, the operation switch may also be used to reverse the direction of movement of the rail car cover system 10 so that the rail car cover system 10 moves back towards the closed configuration.

After the loading or unloading process is completed, the operation switch is activated to bypass the control system. In one such configuration, the operation switch may be moved in a first direction to cause the rail car cover system 10 to move toward to the open configuration and the operation switch may be moved in a second direction to cause the rail car cover system 10 to move toward the closed configuration.

Alternatively, the operation switch may send a signal to the control system, which then determines what operation to perform based upon the current state of the rail car cover system 10. For example, when the control system receives the signal and the rail car cover system 10 is in the fully open configuration, the control system causes the rail car cover system 10 to move towards the closed configuration.

Once the control system is turned on, the hydraulic pump 54 is activated to cause the first cover section 24 and the second cover section 26 to begin moving from the fully open configuration to the closed configuration.

When one of the corner hinge mechanisms 30 reaches the closed configuration, the cover position sensor is activated, which may cause hydraulic fluid to stop flowing to the hydraulic actuator 70 associated with the corner hinge mechanism 30. In other configurations, the hydraulic fluid continues to flow to each of the hydraulic actuators 70 and the hydraulic actuators 70 that are not in the closed configuration continue to operate because there is less resistance placed thereon.

In still another embodiment of the control system, an external power source may be used to cause the rail car cover system 10 to move between the open configuration and the closed configuration. The external power source may be utilized when there is a problem with one of the components in the control system that prevents operation of the hydraulic pump. An example of one such problem is that the batteries are not sufficiently charged to operate the hydraulic power unit was defective but the pump was still operable.

The external power source may assume a variety of configurations using the concepts of the invention. One such external power source is an electric or pneumatic drill. In such a configuration, the control system includes a port through which a portion of the drill may be extended. This configuration thereby enables operation of the rail car cover system 10 without the need for access to the interior of the control system.

The hydraulic pump 54 may include a connection mechanism that facilitates operable attachment of the drill to the hydraulic pump 54. In one such configuration, the connection mechanism is a hexagonal recess formed in the shaft of the hydraulic pump 54. A hexagonal bit having dimensions that are similar to the dimensions of the hexagonal recess may be extended into the hexagonal recess.

While operation of the hydraulic pump 54 using the drill may be slower than utilizing the battery power for the hydraulic pump 54, such a system would enable the rail car cover system 10 to be used in situations where it is not possible to use battery power for the hydraulic pump 54.

Since the drill does not utilize the control system or the battery power, the operation of the rail car cover system 10 using the drill will not cause the indicator lights to illuminate when the control system is turned on or blink when the first cover section 24 and the second cover section 26 are moving between the closed configuration and the open configuration.

Furthermore, the cover position sensors will not indicate when the first cover section 24 and the second cover section 26 are in the fully opened configuration. As such, the person using the drill would have to visually monitor the positions of the first cover section 24 and the second cover section 26 and stop operating the drill when the first cover section 24 and the second cover section 26 are in the fully open configuration.

After the loading or unloading process is completed, the drill is caused to rotate in an opposite direction. Such rotation is continued until the operator visually confirms that the first cover section 24 and the second cover section 26 are both in the closed configuration.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A rail car cover system comprising:
   a rail car having an opening;
   a first cover section operably attached to the rail car;
   a first cover movement mechanism operably attached to the first cover section, wherein the first cover movement mechanism is capable of moving the first cover section between an open configuration and a closed configuration;
   a cover control system comprising:
      a first control component mounted to the rail car, wherein the first control component is in communication with the first cover movement mechanism; and
      a second control component provided proximate to where it is desired to operate the rail car cover system, wherein the second control component is capable of communicating with the first control component; and
   a power source mounted to the rail car, wherein the power source is operably connected to the first cover movement mechanism.

2. The rail car cover system of claim 1, wherein the second control component comprises a rotatable magnetic assembly and wherein the first control component comprises a magnetic field sensor.

3. The rail car cover system of claim 1, wherein the second control component comprises an RFID tag and wherein the first control component comprises an RFID reader that is capable of communicating with the RFID tag.

4. The rail car cover system of claim 1, wherein the second control component comprises an RTLS receiver and wherein the first control component comprises an RTLS transmitter that is capable of communicating with the RTLS receiver.

5. The rail car cover system of claim 1, wherein the second control component is capable emitting a first signal and a second signal that is distinct from the first signal and wherein the first control component must receive the first signal and the second signal before the first control component causes the first cover movement mechanism to move the first cover section between the open configuration and the closed configuration.

6. The rail car cover system of claim 1, wherein the first cover movement mechanism comprises at least one hydraulic actuator and at least one hydraulic pump that is capable of delivering hydraulic fluid to the hydraulic actuator.

7. The rail car cover system of claim 1, and further comprising a feedback mechanism that is capable of providing audible and/or visual feedback relating to the operation of the rail car cover system.

8. A method of operating a rail car cover system comprising:
providing a rail car having an opening;
operably attaching a first cover section to the rail car;
generating a first magnetic field;
sensing the first magnetic field by a first control component that is in communication with a first cover movement mechanism; and
moving the first cover section with respect to the rail car between an open configuration and a closed configuration using the first cover movement mechanism, wherein when the first cover section is in the closed configuration, the first cover section substantially covers the opening.

9. The method of claim 8, wherein the first magnetic field is generated proximate to where product is loaded into the rail car through the opening or where product is unloaded from the rail car through the opening.

10. The method of claim 8, wherein the first magnetic field comprises a magnetic pulse frequency.

11. The method of claim 10, wherein sensing the magnetic field comprises:
measuring the magnetic pulse frequency; and
moving the first cover section only when the magnetic pulse frequency is within a selected range.

12. The method of claim 11, wherein if the magnetic pulse frequency is within a first range, the first cover section is moved towards the open configuration, wherein if the magnetic pulse frequency is within a second range, the first cover section is moved towards the closed configuration and wherein the first range does not encompass the second range.

13. The method of claim 12, wherein the first range is between about 100 and 150 magnetic pulses per second and the second range is between about 30 and 60 magnetic pulses per second.

14. The method of claim 11, and further comprising:
calculating a speed at which the rail car is moving using the magnetic pulse frequency; and
moving the first cover section only if the rail car speed is less than a threshold amount.

15. The method of claim 8, and further comprising
generating a second magnetic field; and
sensing the second magnetic field by the first control component, wherein the first cover section only moves if second magnetic field is sensed before the first magnetic field.

16. The method of claim 8, wherein the first magnetic field is sensed using at least one of a mechanical magnetic field sensor and an electronic magnetic field sensor.

17. The method of claim 8, wherein the first cover movement mechanism comprises at least one hydraulic actuator and at least one hydraulic pump that delivers hydraulic fluid to the hydraulic actuator.

18. The method of claim 8, and further comprising providing power to the first cover movement mechanism using a power source that is mounted on the rail car, wherein the power source comprises at least one battery and at least one solar panel.

19. The method of claim 8, and further comprising:
sensing a position of the first cover section; and
turning off the first cover movement mechanism when the first cover section is in the open configuration or the closed configuration.

20. The method of claim 8, and further comprising:
operably attaching a second cover section to the rail car; and
moving the second cover section with respect to the rail car between the open configuration and the closed configuration with a second cover movement mechanism, wherein the second cover movement mechanism is in communication with the first control component.

21. A method of operating a rail car cover system comprising:
providing a rail car having an opening;
operably attaching a first cover section to the rail car;
providing a first RFID tag;
communicating with the first RFID tag using an RFID reader that is in communication with a first cover movement mechanism;
providing power to the first cover movement mechanism using a power source that is mounted on the rail car; and
moving the first cover section with respect to the rail car between an open configuration and a closed configuration using the first cover movement mechanism when the RFID reader communicates with the first RFID tag.

22. The method of claim 21, wherein the first RFID tag is provided proximate to where product is loaded into the rail car through the opening or where product is unloaded from the rail car through the opening.

23. The method of claim 21, and further comprising
providing a second RFID tag; and
communicating with the second RFID tag using the RFID reader, wherein the first cover section only moves if second RFID tag is sensed before the first RFID tag.

24. The method of claim 21, wherein the first cover movement mechanism comprises at least one hydraulic actuator and at least one hydraulic pump that delivers hydraulic fluid to the hydraulic actuator, wherein the power source comprises at least one battery and at least one solar panel.

25. The method of claim 21, and further comprising:
sensing a position of the first cover section; and
turning off the first cover movement mechanism when the first cover section is in the open configuration or the closed configuration.

26. The method of claim 21, and further comprising:
operably attaching a second cover section to the rail car; and
moving the second cover section with respect to the rail car between the open configuration and the closed configuration with a second cover movement mechanism, wherein the second cover movement mechanism is in communication with the first control component.

27. A method of operating a rail car cover system comprising:
providing a rail car having an opening;
operably attaching a first cover section to the rail car;
generating a first signal;
receiving the first signal by a first control component that is operably attached to a first cover movement mechanism, wherein the first signal causes the first control component to change from a first operational mode to a second operational mode;

generating a second signal; and receiving the second signal by the first control component, wherein in response to the first control component receiving the second signal, the first cover movement mechanism causes the first cover section to move with respect to the rail car between an open configuration and a closed configuration.

28. The method of claim 27, wherein if the first control component does not receive the second signal within a first time interval from receipt of the first signal, the first control component returns to the first operational mode.

29. The method of claim 27, wherein the first signal and the second signal are at least one of a magnetic field and a radio frequency transmission.

30. The method of claim 27, wherein the first signal and the second signal are generated proximate to where product is loaded into the rail car through the opening or where product is unloaded from the rail car through the opening.

31. The method of claim 27, wherein the first signal is a magnetic field having a magnetic pulse frequency.

32. The method of claim 31, wherein the rotating magnetic assembly is rotating at a first frequency and wherein receiving the first signal comprises:

measuring the magnetic pulse frequency; and moving the first cover section only when the magnetic pulse frequency is within a selected range.

33. The method of claim 32, wherein if the magnetic pulse frequency is within a first range, the first cover section is moved towards the open configuration, wherein if the magnetic pulse frequency is within a second range, the first cover section is moved towards the closed configuration and wherein the first range does not encompass the second range.

34. The method of claim 32, and further comprising:

calculating a speed at which the rail car is moving using the magnetic pulse frequency; and moving the first cover section only if the rail car speed is less than a threshold amount.

35. The method of claim 27, and further comprising generating a second magnetic field prior to the first magnetic field; and sensing the second magnetic field by the first control component, wherein the first cover section only moves if second magnetic field is sensed before the first magnetic field.

36. The method of claim 27, wherein the first cover movement mechanism comprises at least one hydraulic actuator and at least one hydraulic pump that delivers hydraulic fluid to the hydraulic actuator and wherein the method further comprises providing power to the first cover movement mechanism using a power source that is mounted on the rail car and wherein the power source comprises at least one battery and at least one solar panel.

37. The method of claim 27, and further comprising:

sensing a position of the first cover section; and turning off the first cover movement mechanism when the first cover section is in the open configuration or the closed configuration.

38. The method of claim 27, and further comprising:

operably attaching a second cover section to the rail car; and moving the second cover section with respect to the rail car between the open configuration and the closed configuration with a second cover movement mechanism, wherein the second cover movement mechanism is in communication with the first control component.

* * * * *